United States Patent [19]

Masopust

[11] Patent Number: 5,199,381
[45] Date of Patent: Apr. 6, 1993

[54] AUTOMATIC FISH FEEDER

[76] Inventor: Nathan Masopust, 246 Joy Rd., Woodstock, Conn. 06281

[21] Appl. No.: 875,381

[22] Filed: Apr. 29, 1992

[51] Int. Cl.$^5$ ............................................. A01K 61/02
[52] U.S. Cl. ................. 119/51.04; 119/51.11; 119/51.12
[58] Field of Search ............... 119/51.04, 51.11, 51.12, 119/51.13, 56.1, 56.2

[56] References Cited

U.S. PATENT DOCUMENTS

| | | | |
|---|---|---|---|
| 2,700,489 | 1/1955 | Sheft | 119/51.04 |
| 3,022,767 | 2/1962 | Malek | 119/51.04 |
| 3,156,214 | 11/1904 | Denney et al. | 119/51.04 |
| 3,826,231 | 7/1974 | Crawford et al. | 119/51.12 |
| 4,249,483 | 2/1981 | Sobky | 119/51.12 |
| 4,805,560 | 2/1989 | Kuego et al. | 119/51.12 |
| 5,062,382 | 11/1991 | Matsuda | 119/51.04 |
| 5,078,097 | 1/1992 | Chisholm | 119/51.11 |

OTHER PUBLICATIONS

FishMate F14 automatic fish feeder instructions.

*Primary Examiner*—John G. Weiss
*Attorney, Agent, or Firm*—William J. Sapone

[57] ABSTRACT

An automatic fish feeder has a separable container having a plurality of compartments which can be mounted on a rotatable shaft extending from an angled surface of a housing. The container has a lid with an opening through which food is dispensed. The container mounts on the rotatable shaft while the lid is fixed in position by one or more clips. Thus the container is rotatable beneath the lid to dispense food through the opening. The shaft is connected to a drive device, motor and power supply. By the proper choice of container and motor drive speed 7, 10 or 14 day automatic feeding can be reliably attained.

18 Claims, 3 Drawing Sheets

AUTOMATIC FISH FEEDER

TECHNICAL FIELD

This invention relates to fish feeding devices and more particularly to a timed automatic fish feeder having a plurality of partially closed compartments for dispensing food into an aquarium.

BACKGROUND

It is important when maintaining an aquarium that food be provided on a regular and consistent basis to assure the health and vitality of fish in the aquarium. Failure to feed fish on a regular basis can not only result in starvation but increases stress which can result in the onset of disease. Consequently, when vacations or other activities prevent regular feeding, methods and apparatus must be utilized to provide food in the feeders' absence.

One method for providing food to fish in an aquarium during extended absence is a solid type food which is placed within the tank and dissolves in a slow release fashion to release food on a regular basis. However, the type and quantity of food and the degree to which the food is released may vary depending upon tank chemistry and it is also limited in the quality of food which is released.

One apparatus for feeding fish, known as a "Fishmate", is a horizontally mounted device which requires a hole cut in the top of a tank cover, positioning of the device such that an aperture in the device is aligned with the hole. The device has a wheel made up of a pair of concentric rings with vertical walls between them which sits on a flat surface. The wheel works somewhat like a paddle wheel for pushing food over the hole which then falls into the tank. The wheel has inwardly engaging tabs which periodically engage a drive device, such that the wheel moves in periodic amounts which correspond to the width of the opening. To use the device requires setting pins in appropriate slots in the drive, setting the drive device timer, and placing food in the segmented portions of the wheel. However, since the wheel has no bottom surface, it is possible that the food could become moist and stick to the device surface and thus either slide beneath the rotating wheel or cause the wheel to jam. Consequently, the search continues for apparatus for automatic fish feeding.

SUMMARY OF THE INVENTION

It is an object of the present invention to provide a fish feeder which is automatic, reliable and easily affixed to an aquarium.

It is a further object to provide an automatic fish feeder which has large compartments, each compartment capable of providing a daily dose of food into an aquarium.

It is a further object to provide improved release of the fish food from the container by proper positioning of the fish feeder.

These and other objects of the present invention are achieved by providing a fish feeding apparatus for an aquarium comprising a container mounted on a shaft and rotatable therewith in a timed fashioned, the container releasably clipped to the shaft and disposed at an angle relative to the surface of the aquarium, the shaft connected to a motor which rotates the shaft, a stationary lid covering the container and having an opening alignable periodically with a food containing compartment in the container, to allow discharge of the food through the opening, the feeder having mounting means along a lower portion thereof for clipping onto a wall of the aquarium.

BRIEF DESCRIPTIONS OF THE DRAWINGS

DETAILED DESCRIPTION OF THE INVENTION

Figure 1:
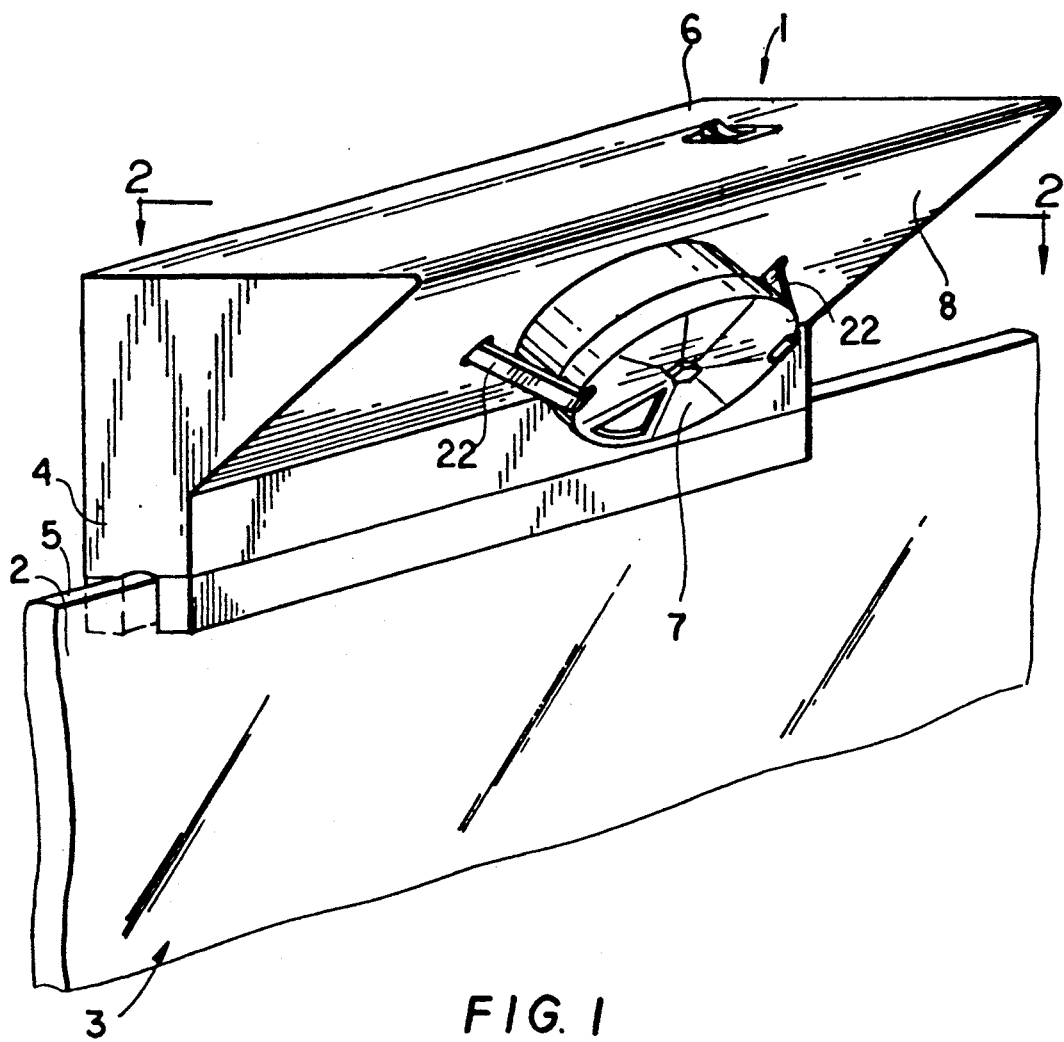
FIG. 1 is a perspective view of the fish feeder of the invention mounted on a wall of an aquarium.

Referring to FIG. 1, a fish feeder 1 is mounted on a wall 2 of an aquarium 3. The feeder has a U-shaped saddle 4 which sits on an edge 5 of the wall preferably with an interference fit. The legs of the saddle are preferably made of a somewhat resilient material to assure a snug fit of the feeder on the aquarium. The feeder 1 has a housing 6 for mounting a food container 7 on a front angled surface 8.

Figure 2:
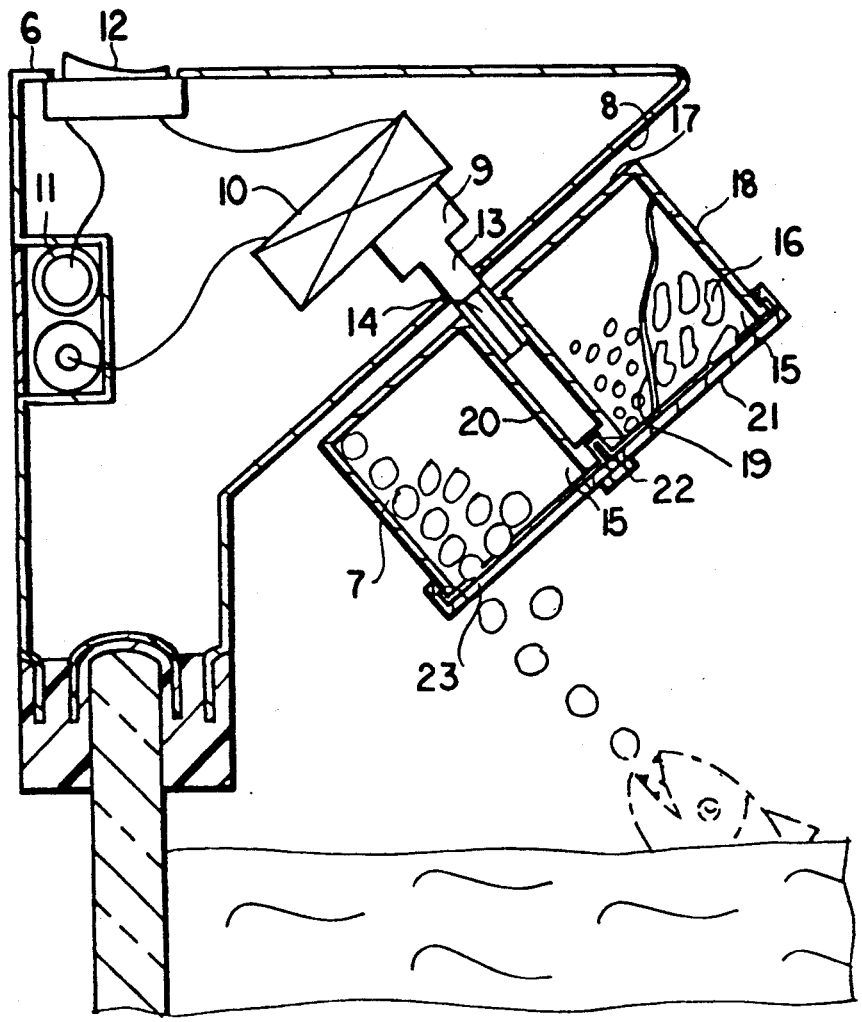
FIG. 2 is a cross-sectional view of the fish feeder of FIG. 1, taken along line 2—2.
Figure 3:
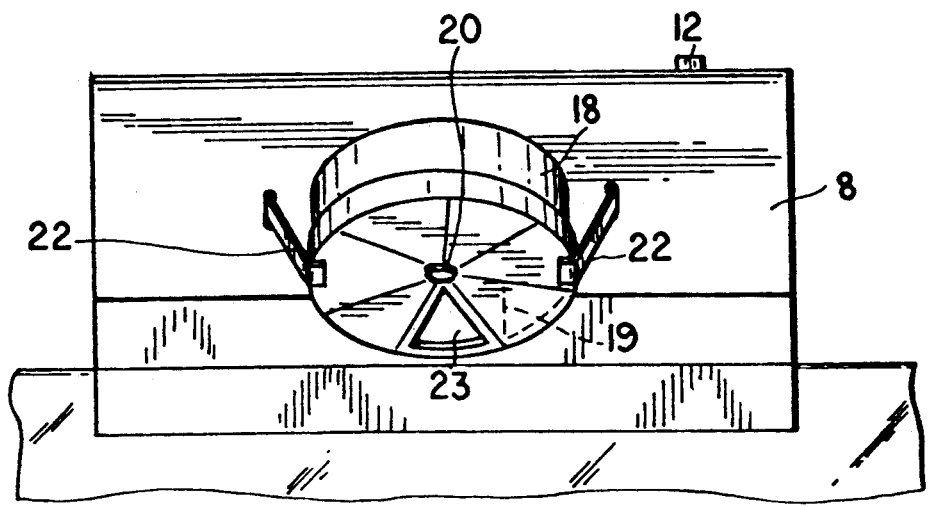
FIG. 3 is a front view of the fish feeder of the invention.

Referring to FIGS. 2 and 3 a drive device 9 is located within the housing. Preferably the drive device is connected to a motor 10 which is connected to one or more batteries 11. Preferably the drive device includes a series of gears or other means for speed adjustment. A switch 12 is provided for activating the motor.

The drive device 9 has a rotatable shaft 13 which extends from the front forwardly angled surface 8 of the feeder. At the end of the shaft is a shaped portion 14, for example, having a square or hexagonal shape.

The round container 7 has a plurality of compartments 15, each compartment sized to retain a quantity of food 16 therein. The number of compartments is a matter of design choice and from 2 to 20 compartments may be used. The container is a stand alone device which includes a bottom 17, an outer ring wall 18 and dividing walls 19 to define pie shaped compartments. The container also has a socket 20 in the bottom thereof sized to mate with the shaped portion of the shaft for rotation therewith. Thus, the container rotates with the shaft when power is supplied to the motor.

A lid 21 is removably fitted over the container 7. The cover is held in place by clips 22 which extends from the surface of the feeder. As the container rotates with the shaft, the clips hold the cover stationary. The lid has an opening 23 positioned at a lower portion which is alignable with and sized complimentary to each compartment of the container. As the container rotates, the compartments align with the opening and, as shown, food is discharged therefrom. The angle of the front face of the feeder facilities discharge through the opening in the lid.

In operation, the container 7 is separated from the feeder and all but one of the compartments are filled with the desired quantity of food. This allows the user to choose proper proportions of food and to alter the variety of food on a day to day basis. The lid 21 is placed over the container, aligned with the empty compartment and then loaded as an assembly onto the drive shaft 13. The clips 22 lock the lid in position and hold the container on the shaft. The switch 12 located on the housing is turned on and the motor disposed within the housing is activated. The motor and drive device are sized to provide slow rotation of the container in fractional fashion over 24 hours. For example, the motor may be associated with a gear reduction system such that the container moves 1/7th rotation every 24 hours and thus if the container has 7 compartments, then every 24 hours the portion of the food in one compartment will be discharged. Similarly, the motor can be sized to provide various speed reductions, for example a 1/10th or 1/14 revolution in 24 hours and thus provides 10 and 14 day feedings.

Figure 4:
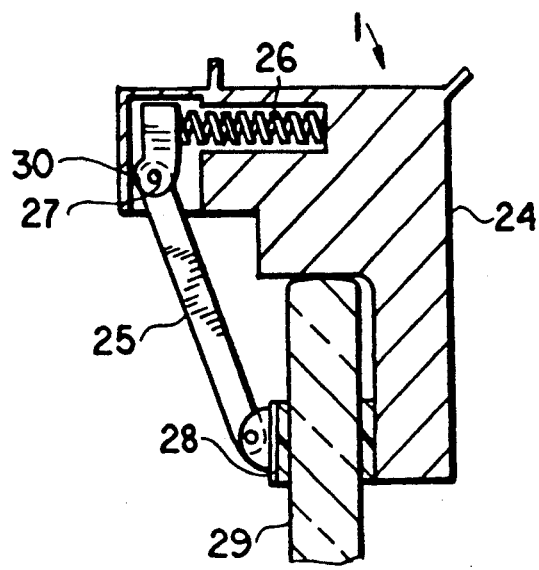
FIG. 4 is a view of an alternative mounting assembly.

Referring to FIG. 4, an alternative means for mounting the fish feeder 1 is shown. Instead of a saddle, a stationary leg 24 and a movable leg 25 are located in a facing relationship. The movable leg 25 is biased by a spring 26 and pivots about a hinge 27. The leg 25 has an engaging pad 28 pivotally mounted at its end for mating with the aquarium surface 29. The pivotal pad assures full surface contact regardless of leg angle. A button 30 locks the leg in its mated position, pressing in the button releases the lock to allow the leg 25 to swing free for dismounting.

Figure 5A:
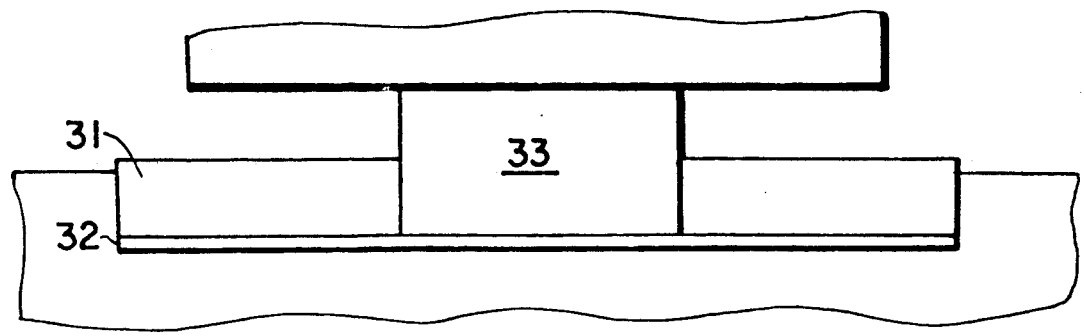
FIGS. 5a and 5b are views of a mounting assembly for round aquariums.
Figure 5B:
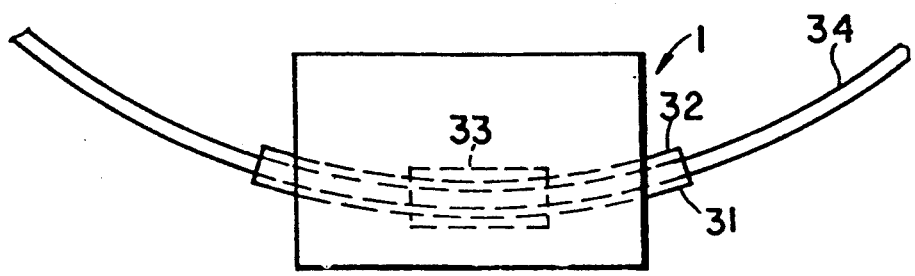

Referring to FIGS. 5a and 5b, another alternative means for mounting the fish feeder 1 is shown. In this instance, a pair of flexible strips 31 and 32 extend from a central saddle 33. The strips are spaced from each other at a distance less than the thickness of an aquarium wall to provide a snug fit. The strips are resilient as well as flexible such that they may adapt to the contour of a round, oblong or other shape aquarium. FIG. 5b shows the fish feeder 1 mounted onto a round aquarium 34 with the strips pressed over the aquarium wall, conforming to the curvature of the walls.

The fish feeder of the invention has numerous advantages such as improved control of the feed discharge, separable unitary food storage which allows ease in clean up and prevents the possibility of food jamming the driving mechanism. This feeder also avoids the need for a separate cover hole as the fish feeder can be located adjacent air piping on an edge of the tank for discharge in that location. Also, several containers can be preloaded as cartridges for quick change every 7 or 14 days and thus the apparatus of the invention would be useable on a convenient weekly or biweekly basis. The positive drive features of the invention assures that the container will rotate properly and the battery assures that the device will operate during power failures. This also minimizes the potential for electrical shock, should the device fall into the tank. Consequently, the potential for inadequate or no feeding due to apparatus failure is substantially reduced.

While preferred embodiments of the present invention have been shown and described, it will be understood by those skilled in the art that various changes and modifications could be made without varying from the scope of the present invention.

We claim:

1. A fish feeding apparatus for an aquarium comprising:
   a housing having a surface angled relative to a surface of the aquarium;
   drive means disposed within the housing and having engaging means extending outwardly from the housing angled surface, the drive means rotating the engaging means;
   container means for food having a plurality of compartments mounted on the engaging means and rotatable therewith;
   lid means disposed over the container means, the lid means fixed relative to the housing, the container means rotating relative to the lid, the lid means having an opening for discharging food therethrough;
   means for mounting the apparatus on an aquarium and, means for removably mounting the lid means and container means as an assembly to the engaging means, means for removably mounting the lid means and container means as an assembly being a clip means which extend from the angled surface and have tab means for holding the assembly on the engaging means.

2. The apparatus of claim 1 wherein the drive means comprise a motor and a speed reduction device for providing a slow rotation of the engaging means.

3. The apparatus of claim 1 wherein the engaging means is a shaft having a shaped end.

4. The apparatus of claim 1 wherein the container means is a round container having a central socket in a bottom surface thereof, the socket having a complementary shape to the shape of the engaging means.

5. The apparatus of claim 1 wherein the container means has from 2 to 20 compartments.

6. The apparatus of claim 1 wherein the container means has 7 compartments.

7. The apparatus of claim 1 wherein the opening in the lid means has the same size as a compartment.

8. A fish feeding apparatus for an aquarium comprising;
   a housing having a surface angled relative to a surface of the aquarium;
   drive means disposed within the housing and having engaging means extending outwardly from the housing angled surface, the drive means rotating the engaging means;
   container means for food having a plurality of compartments mounted on the engaging means and rotatable therewith;
   lid means disposed over the container means, the lid means fixed relative to the housing, the container means rotating relative to the lid, the lid means having an opening for discharging food therethrough;
   means for mounting the apparatus on an aquarium, wherein the mounting means comprise a U-shaped saddle which rests on an edge of a wall of the aquarium.

9. The apparatus of claim 8 wherein the drive means comprise a motor and a speed reduction device for providing a slow rotation of the engaging means.

10. The apparatus of claim 8 wherein the engaging means is a shaft having a shaped end.

11. The apparatus of claim 8 wherein the container means is a round container having a central socket in a bottom surface thereof, the socket having a complementary shape to the shape of the engaging means.

12. The apparatus of claim 8 wherein the container means has from 2 to 20 compartments.

13. The apparatus of claim 8 wherein the container means has 7 compartments.

14. The apparatus of claim 8 wherein the opening in the lid means has the same size as a compartment.

15. The apparatus of claim 8 further comprising means for removably mounting the lid means and container means as an assembly to the engaging means.

16. The apparatus of claim 15 wherein the means for removably mounting the lid means and container means as an assembly comprise clips which extend from the angled surface and have tabs for holding the assembly on the engaging means.

17. A fish feeding apparatus for an aquarium comprising;
- a housing having a surface angled relative to a surface of the aquarium;
- drive means disposed within the housing and having engaging means extending outwardly from the housing angled surface, the drive means rotating the engaging means;
- container means for food having a plurality of compartments mounted on the engaging means and rotatable therewith;
- lid means disposed over the container means, lid means fixed relative to the housing, the container means rotating relative to the lid, the lid means having an opening for discharging food therewith; and, means for mounting the apparatus on an aquarium, wherein the mounting means are a fixed leg, a movable leg and means for biasing the legs into close proximity with each other.

18. A fish feeding apparatus for an aquarium comprising:
- a housing having a surface angled relative to a surface of the aquarium;
- drive means disposed within the housing and having engaging means extending outwardly from the housing angled surface, the drive means rotating the engaging means;
- container means for food having a plurality of compartments mounted on the engaging means and rotatable therewith;
- lid means disposed over the container means, lid means fixed relative to the housing, the container means rotating relative to the lid, the lid means having an opening for discharging food therethrough; and,
- means for mounting the apparatus on an aquarium, the mounting means being a pair of flexible, longitudinally extending resilient strips which slip over and contour to the shape of an aquarium wall.

* * * * *